United States Patent [19]
Bakholdin et al.

[11] Patent Number: 5,566,588
[45] Date of Patent: Oct. 22, 1996

[54] FLYWHEEL ROTOR WITH CONICAL HUB AND METHODS OF MANUFACTURE THEREFOR

[76] Inventors: Daniel Bakholdin, 14929 Sylvan St., Van Nuys, Calif. 91411; Robert W. Bosley, 18104 Hoffman Ave., Cerritos, Calif. 90701; Harold A. Rosen, 14629 Hilltree Rd., Santa Monica, Calif. 90402

[21] Appl. No.: 181,038
[22] Filed: Jan. 14, 1994
[51] Int. Cl.$^6$ ................................ H05K 5/04; H05K 7/02
[52] U.S. Cl. ................................................. 74/572; 310/74
[58] Field of Search .................... 74/572, 573 F; 310/74

[56] References Cited

U.S. PATENT DOCUMENTS

| | | | |
|---|---|---|---|
| 4,058,024 | 11/1977 | Gordon | 310/74 X |
| 4,283,959 | 8/1981 | Strittmatter et al. | 74/572 X |
| 4,343,203 | 8/1982 | Jacobson et al. | 74/572 X |
| 4,821,599 | 4/1989 | Medlicott | 74/572 |
| 4,991,462 | 2/1991 | Breslich, Jr. et al. | 74/572 |

Primary Examiner—Rodney H. Bonck
Assistant Examiner—Mary Ann Battista
Attorney, Agent, or Firm—Raymond H. J. Powell, Jr.

[57] ABSTRACT

A flywheel rotor used in a flywheel energy storage system providing a high energy storage capacity while providing an ample volume for a high power motor-generator within its envelope includes an outer, primarily cylindrical body having conically tapered end sections, a conical hub section attached to the outer body, and a relatively short inner cylinder, which cylinder connects shaft to the inner portion of the conical hub section. In an exemplary case, the individual components are predominantly constructed of filament wound fiber composites while allowing material choices to be driven by both cost and performance. According to one aspect of the rotor, the inner portion of the inner cylinder can be a slotted aluminum cylinder.

17 Claims, 13 Drawing Sheets

FLYWHEEL ROTOR WITH CONICAL HUB AND METHODS OF MANUFACTURE THEREFOR

BACKGROUND OF THE INVENTION

1. Field of the Invention

The present invention relates to a rotor employed in a flywheel energy storage device. More specifically, the present invention relates to a rotor wherein the power density and the energy density of the system are optimized while the manufacturing cost is minimized. Methods for manufacturing a rotor according to the present invention are also disclosed.

2. Description of the Prior Art

Flywheel systems currently being designed for mobile energy storage are generally intended to replace batteries in electrically powered vehicles. One specific example of such a system was disclosed in commonly assigned, co-pending application Ser. No. 08/148,361, which is incorporated herein by reference for all purposes. In such applications, multiple units are needed to store the required energy, so that each motor-generator need supply only a small portion of the vehicle's power. In systems where all of the surge power must be supplied by a single flywheel, the relatively large size of the single motor-generator makes it difficult to provide the needed energy density without reducing safety factors, e.g., for radial stresses, to unacceptable low levels or raising manufacturing costs to exorbitantly high levels.

U.S. Pat. No. 3,741,034 discloses rotor designs using high strength-to-weight ratio filament wound composites in relatively thin concentric cylinders, which cylinders are separated by radial springs. While this arrangement limits the radial stresses to tolerable values, it is expensive to manufacture.

U.S. Pat. No. 3,859,868 discloses techniques for varying the elasticity-density ratio of the rotor elements to minimize radial stresses. On the other hand, U.S. Pat. Nos. 4,341,001 and 4,821,599 describe the use of curved metallic hubs to connect the energy storage elements to the axle.

None of these references deal with the integration of a large, high power motor-generator into the flywheel energy storage system currently being designed for vehicles.

SUMMARY OF THE INVENTION

The principle purpose of the present invention is to provide a high energy density rotor.

Another object according the present invention is to provide a high energy density rotor which includes ample space within its volume for a large, relatively high power motor-generator.

Still another object according the present invention is to provide a high energy density rotor which can be easily manufactured.

Yet another object according the present invention is to provide a high energy density rotor which can be manufactured at a reasonable cost.

These and other objects, features and advantages according to the present invention are provided by a rotor including a generally cylindrical outer portion for storing most of the energy, and a hub portion attaching the outer portion to the shaft. In an exemplary case, the hub portion includes a thin-walled conical member which can be attached to the outer cylindrical portion at the outer extremity of the hub portion, and an inner cylindrical member of relatively short axial extent upon which the conical member is wound.

According to one aspect of the invention, the arrangement of rotor components provides the desired geometric properties in a readily manufacturable configuration.

These and other objects, features and advantages according to the present invention are provided by a method for manufacturing a hub, including an inner cylindrical member and a conical connecting member, and an outer cylindrical portion, arranged in that order. The method includes the steps of providing an aluminum cylinder including radial slots, winding a first material about the aluminum cylinder so as to extend a radius of the aluminum cylinder by a predetermined amount, winding a first fiber having a predetermined tensile strength in a first direction so as to form a conical member extending at a predetermined first angle and winding a second fiber having: a predetermined second tensile strength, the second tensile strength being much greater than the first tensile strength, in a second direction so as to form a cylinder portion.

These and other features and advantages of the present invention will become more apparent from the following detailed description, taken in conjunction with the accompanying drawings.

BRIEF DESCRIPTION OF THE DRAWINGS

The preferred embodiments are described with reference to the drawings, in which like elements are denoted by like numbers, and in which:

FIG. 3 is an alternative view of an outer cylindrical portion of the flywheel generally illustrated in FIG. 2 wherein FIG. 3A illustrates structural members included in the cylindrical portion while

FIG. 6A is a sectional view of the hub portion shown in FIG. 2, while

FIG. 7A is an expanded view illustrating the details between cylindrical portion and the hub portion of the rotor shown in FIG. 2, while

DESCRIPTION OF THE PREFERRED EMBODIMENT

Figure 1:
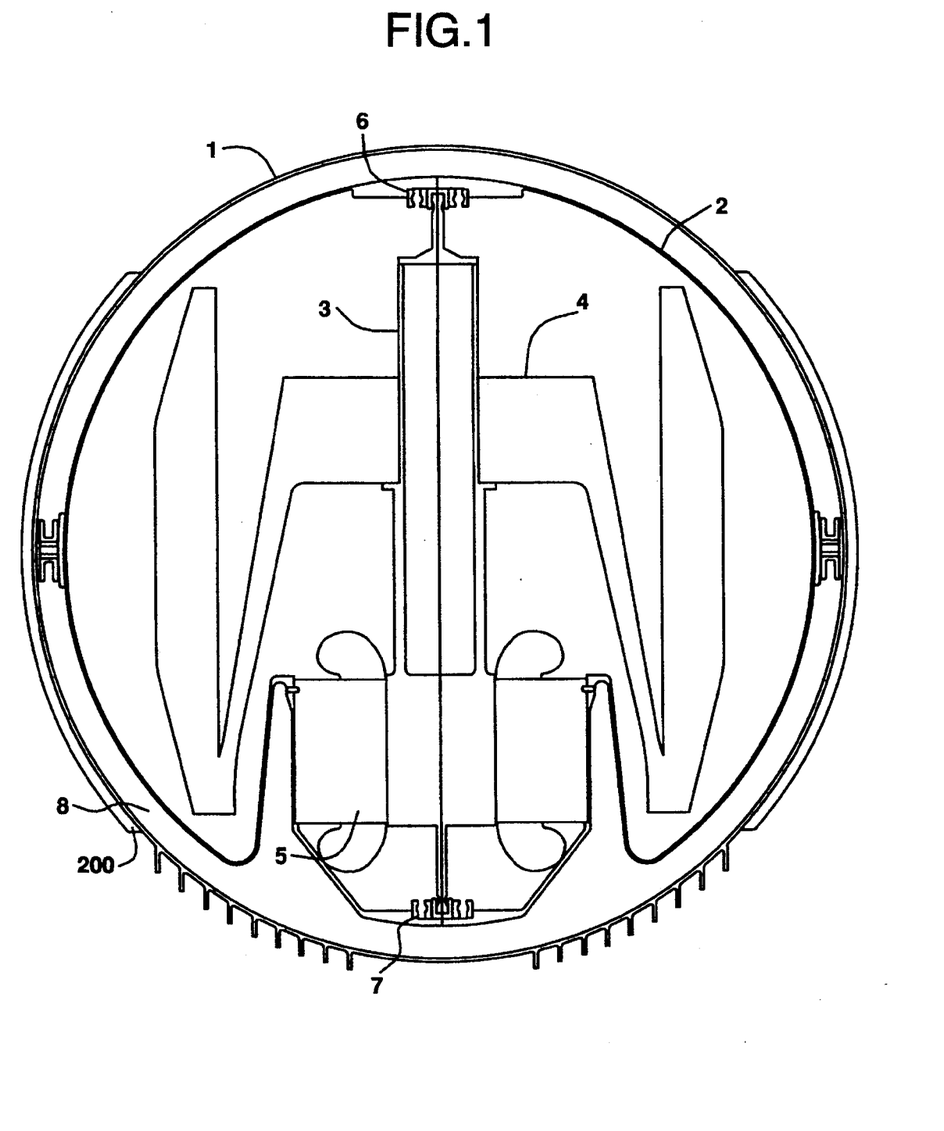
FIG. 1 is a illustrative view of the flywheel energy storage system.

The general arrangement of the flywheel energy storage system according to the present invention is shown in FIG.

1, which includes an outer housing 1 and vacuum housing 2 separated from one another by a fluid 8 in which the vacuum housing 2 floats. A rotor 4 is connected to the rotating shaft 3, which is supported by magnetic bearings 6 and 7. A motor-generator 5 advantageously converts mechanical energy into electrical energy and vice versa. A mechanical barrier, e.g., a KEVLAR aramid fiber wrap 19, provides a safety barrier for the flywheel energy storage system.

Preferably, rotor 4, which in an exemplary case is 12 inches in diameter, stores 2 kilowatt-hours, i.e., 7,200,000 joules, of energy at a maximum rotational speed of 8000 radians per second. It will be appreciated that this corresponds to a surface speed of over 1200 meters per second. It will be noted that this high speed requires that the rotating assembly be enclosed in an evacuated container. Moreover, the high centrifugal accelerations require that the rotor 4 be constructed primarily of high strength fiber composites, e.g., a filament wound in the circumferential direction.

Figure 2:
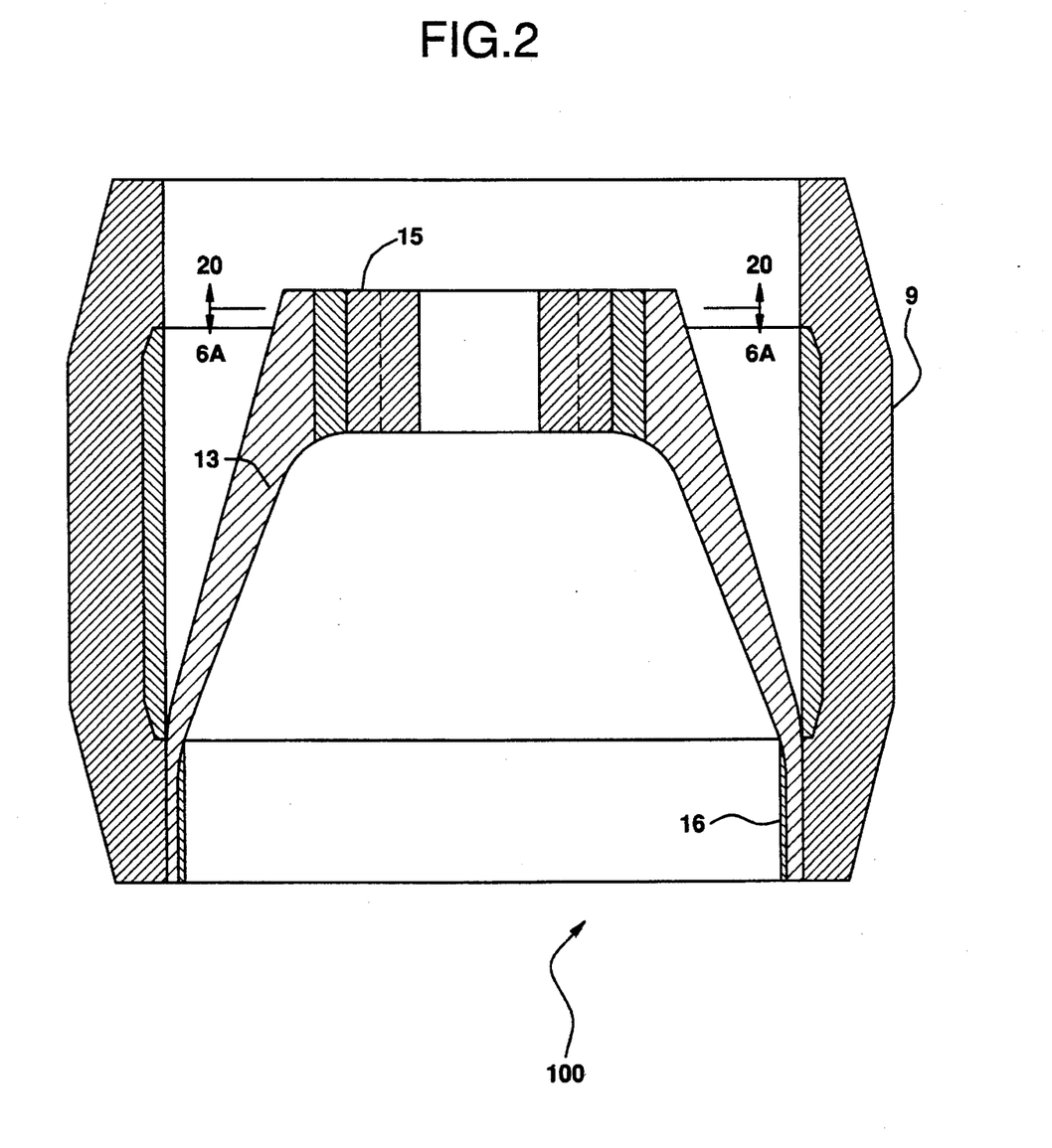
FIG. 2 is a focused view which is useful in explaining the construction of a flywheel rotor according to the present invention.
Figure 3A:
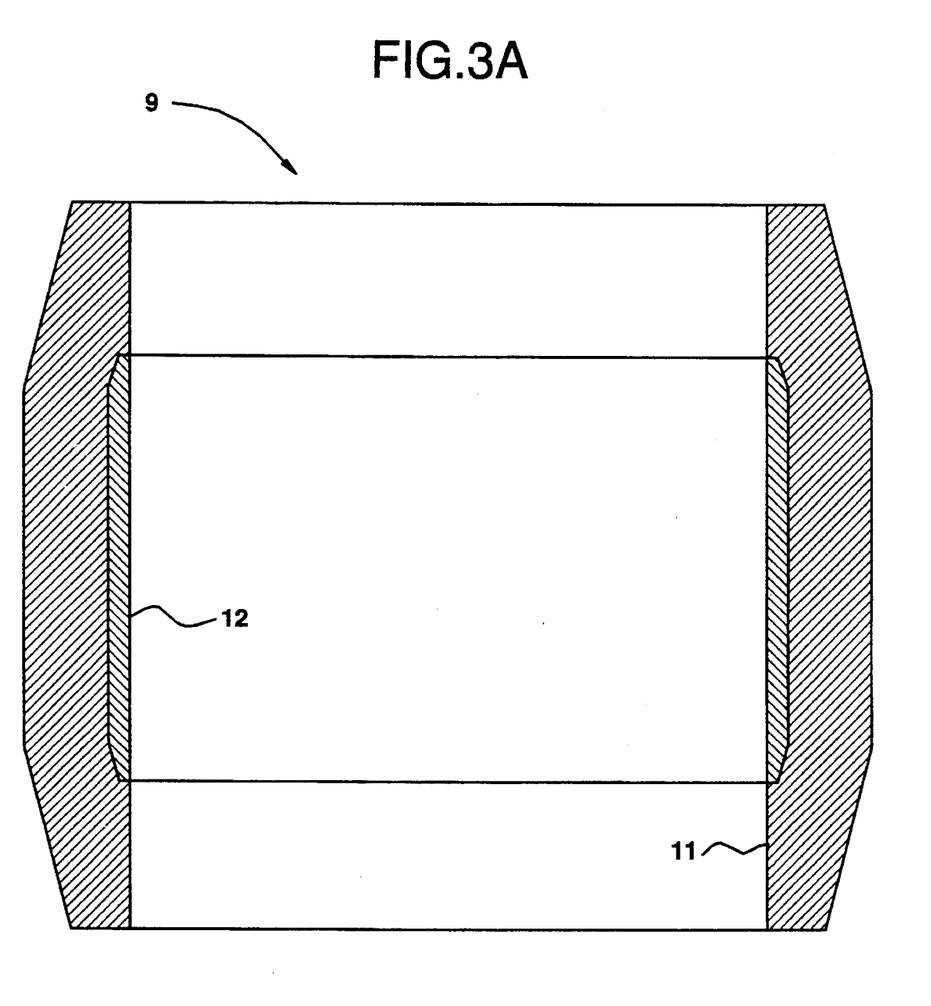
Figure 3B:
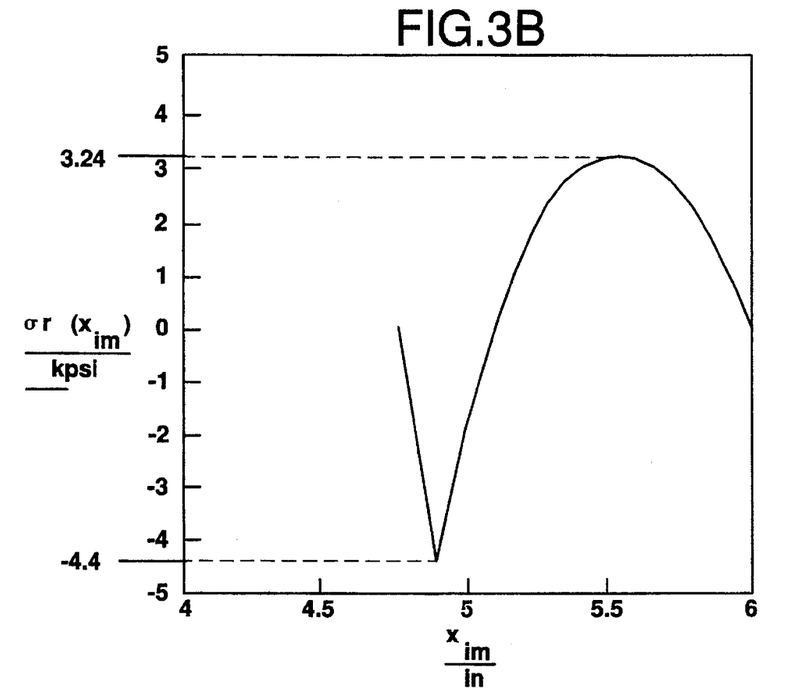
FIG. 3B illustrates radial stress and FIG. 3C illustrates tangential stress in the cylindrical portion shown in FIG. 3A.
Figure 3C:
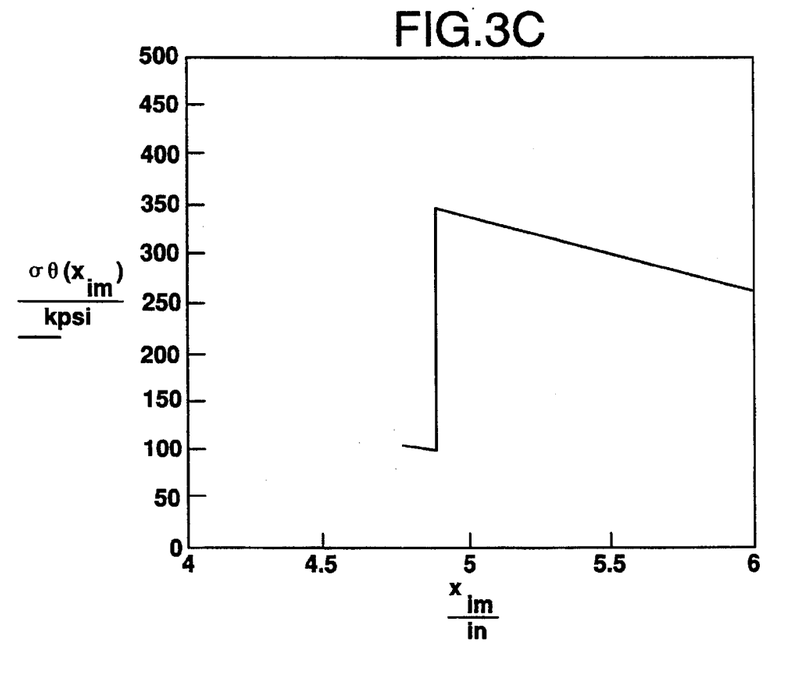

Preferably, rotor 4, which is shown in more detail in FIG. 2, includes two major elements, an outer, primarily cylindrical portion 9, which in an exemplary case is 12 inches long, and a hub portion 100 including a conical member 13 and an inner cylindrical member 15. The primarily cylindrical portion 9, which is shown in FIG. 3A, consists of two elements, an outermost member 11, which preferably is a filament wound composite using the highest strength graphite fiber available to sustain the centrifugal acceleration of one million G's and an inner cylinder member 12, which is a filament wound fiberglass composite whose combination of density and modulus of elasticity create a moderate compressive load on the outermost member 11. This advantageously minimizes the radial tension in the outermost member 11. The radial and tangential stresses achieved with this material are shown in FIGS. 3B and 3C, respectively. These stresses, calculated at a central section of the cylinder, advantageously are well within the allowable stresses for the material systems described.

The highest strength graphite fiber, which is used in fabrication of outermost member 11, advantageously has a minimum tensile strength of about 924,000 lb/in$^2$ (924 kpsi) while the wound fiberglass used in the fabrication of inner cylinder member 12 has a tensile strength of about 500 kpsi. It should be noted that the moderate strength graphite fiber used in conical member 13 has a minimum tensile strength of about 714 kpsi. High strength aluminum with a minimum tensile strength of about 75 kpsi advantageously can be used in the construction of the hub portion 100, as discussed in greater detail below.

Figure 4:
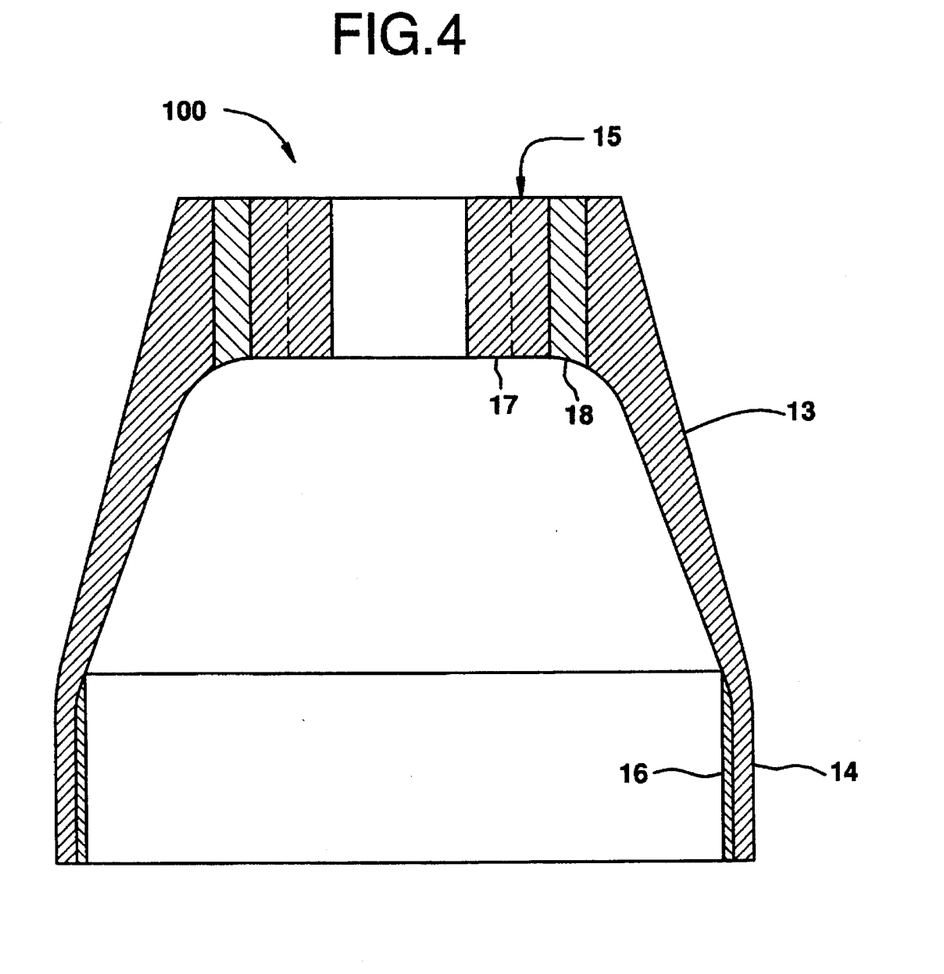
FIG. 4 is an illustrative overview of the hub portion of the flywheel illustrated in FIG. 2.

The hub portion 100, shown in FIG. 4, consists of an outer, cylindrical member 14, a conical member 13 and an inner cylindrical member 15. Members 14 and 13 are preferably filament wound composites using a lower strength, i.e., lower cost, graphite fiber than the outermost member 11. A thin fiberglass filament wound cylinder member 16 forms the inner surface of member 14.

Figure 5:
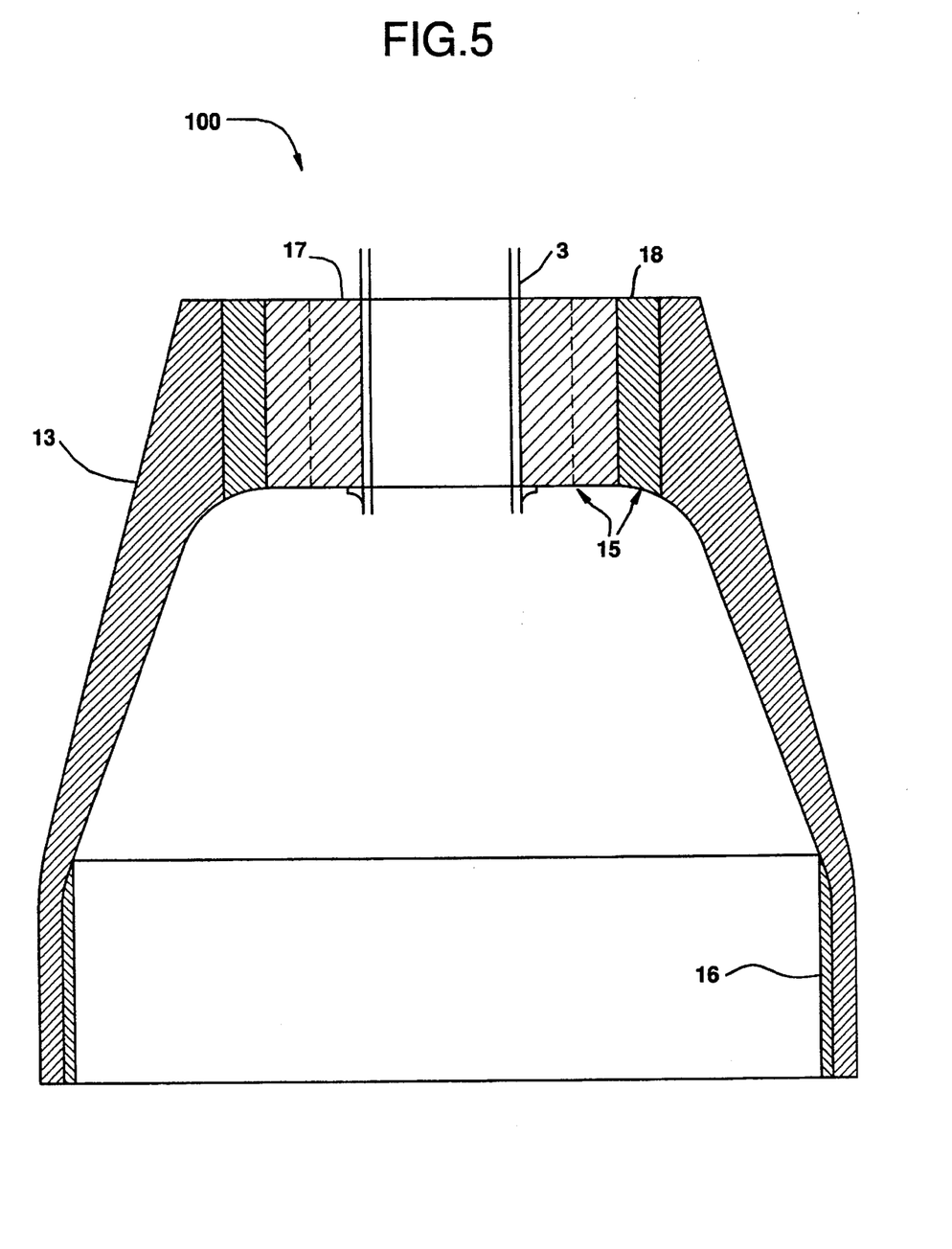
FIG. 5 is an expanded view of the hub portion shown in FIG. 4, which view provides exemplary details of the hub portion construction.
Figure 6A:
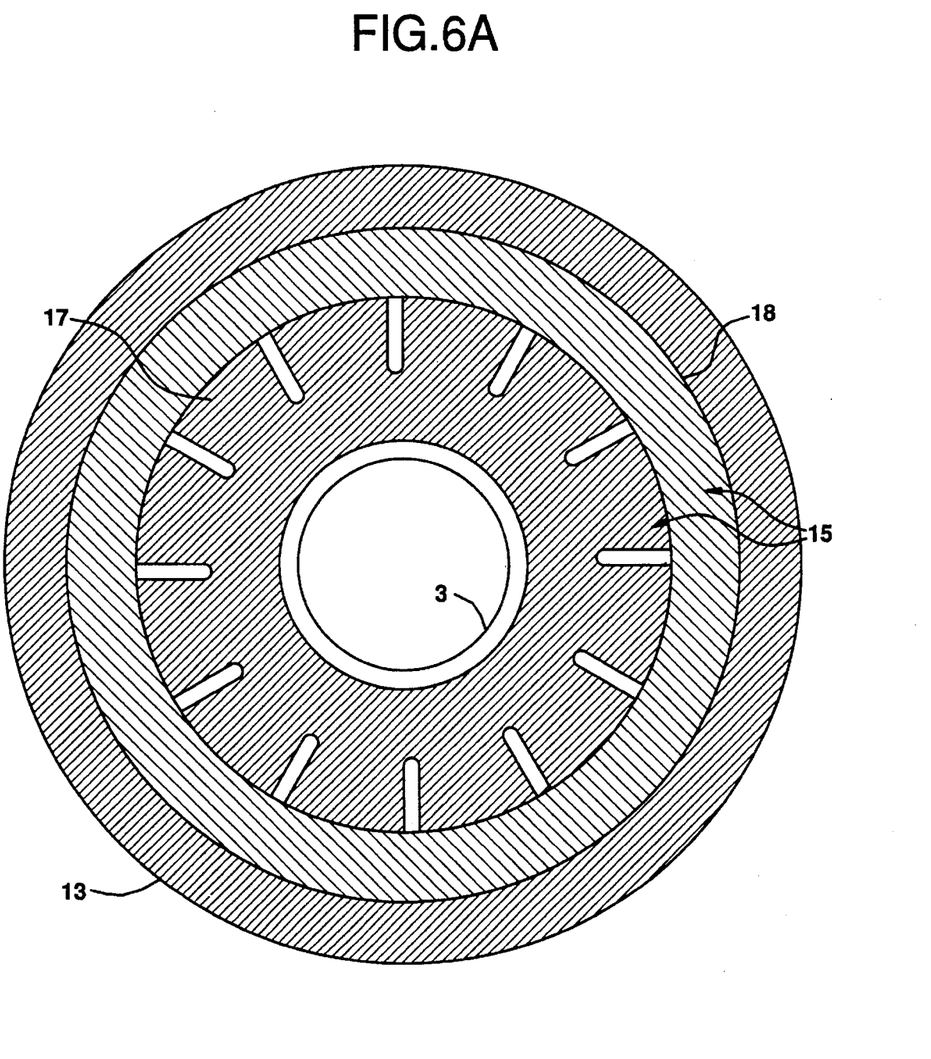
Figure 6B:
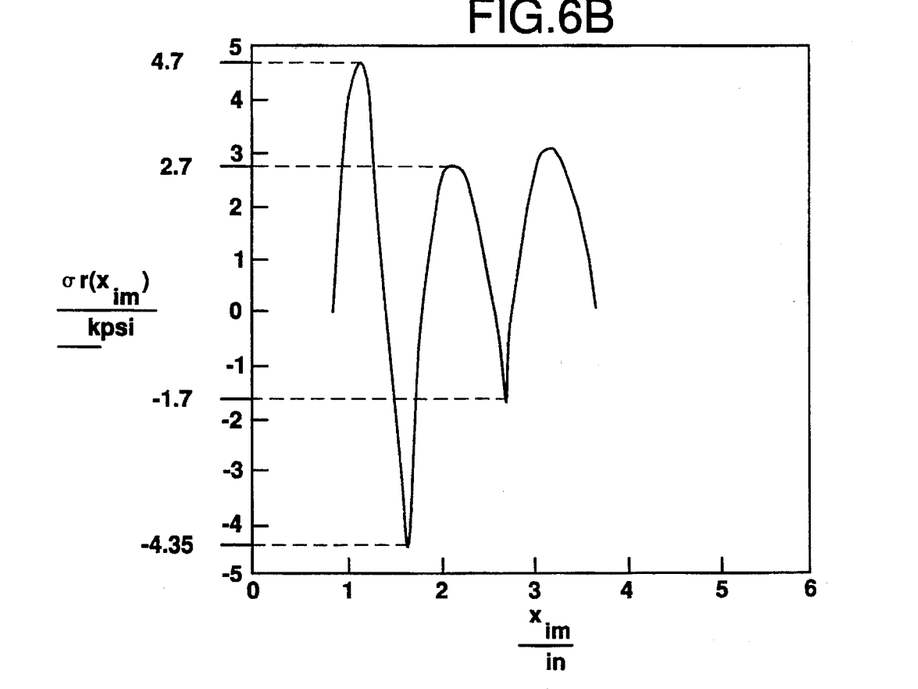
FIGS. 6B and 6C illustrate radial and tangential stresses, respectively, of the inner cylindrical member of the hub portion shown in FIG. 6A.
Figure 6C:
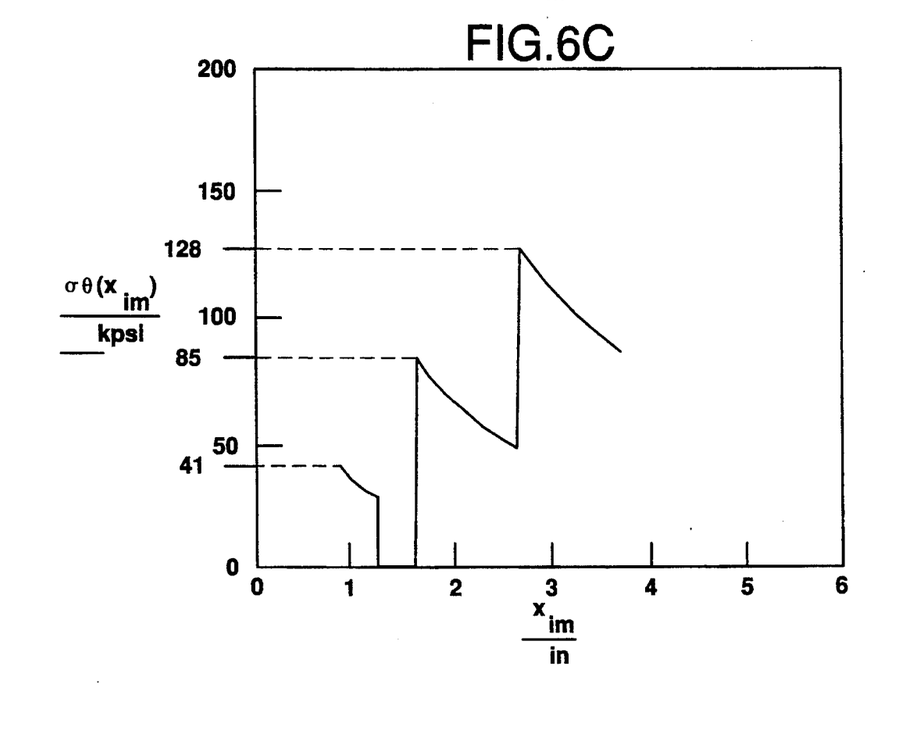

Details of member 15 of the hub portion 100 are shown in FIGS. 5 and 6A. Member 15 consists of a slotted aluminum cylinder 17 and a filament wound fiberglass composite cylinder member 18 which bridge the radial distance between the shaft 3 and the conical member 13 of the hub portion 100. Preferably, this maximizes the inner radius of member 13 while minimizing its cone angle, thus making it easier to wind. The calculated radial and tangential stresses in member 15 are shown in FIGS. 6B and 6C, respectively. This choice of materials and geometry keeps the radial stresses in this member well within allowable limits.

Moreover, this arrangement advantageously provides a low cost way to bridge the space between the shaft and the cone, while keeping the radial stresses very low and concurrently making the low cone angle possible.

Figure 7A:
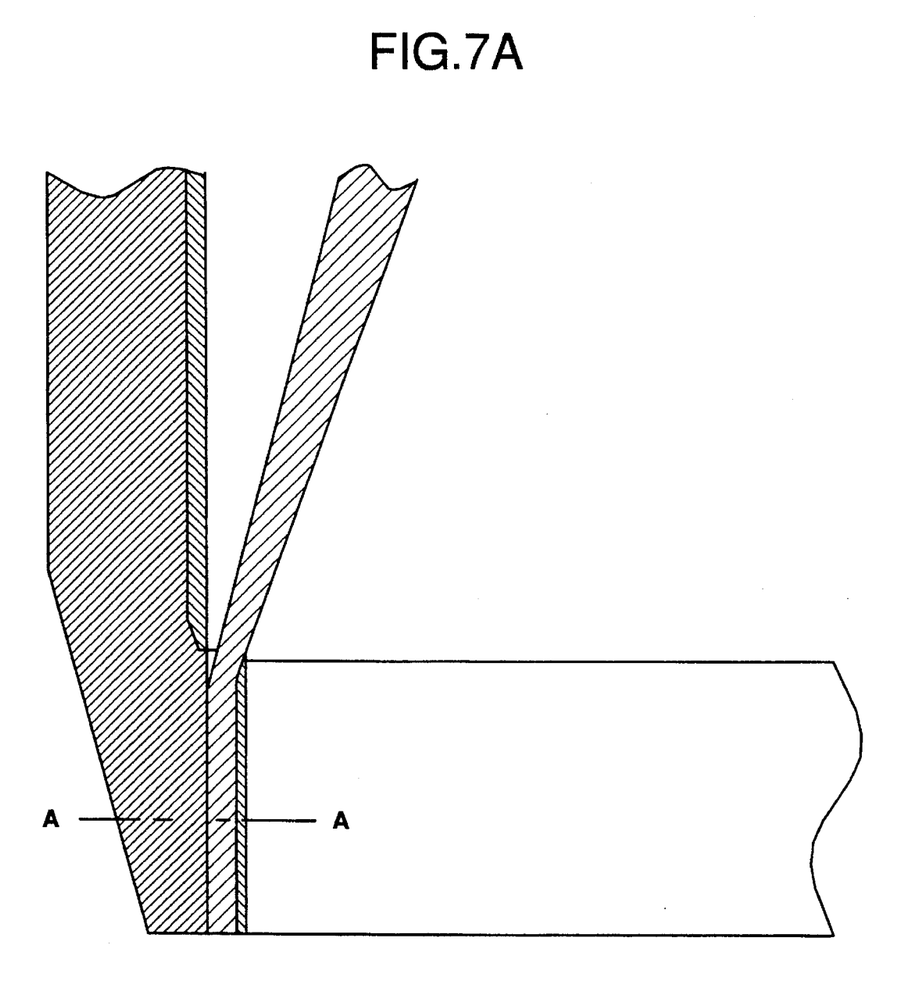
Figure 7B:
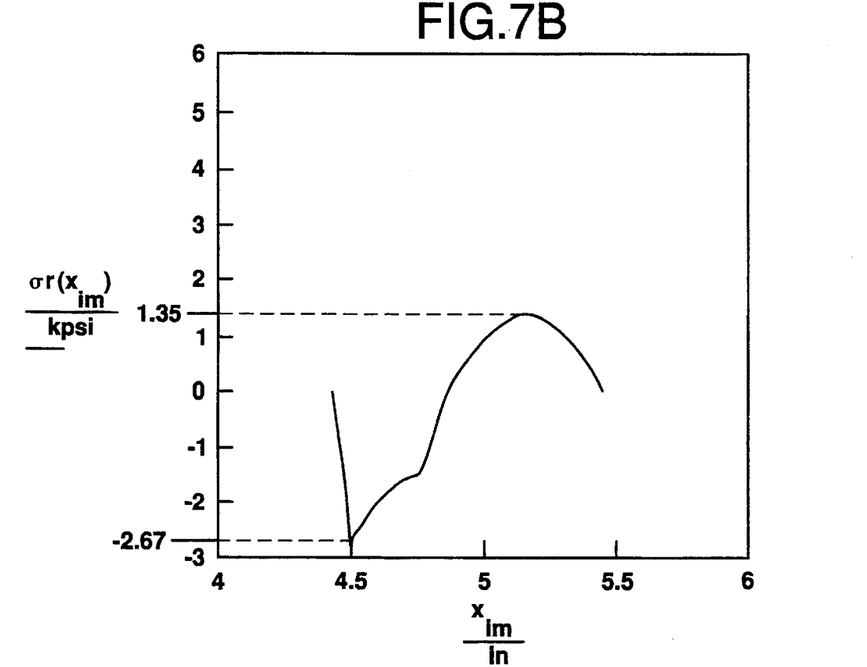
FIGS. 7B and 7C illustrate radial and tangential stresses found along the line A—A shown in FIG. 7A.
Figure 7C:
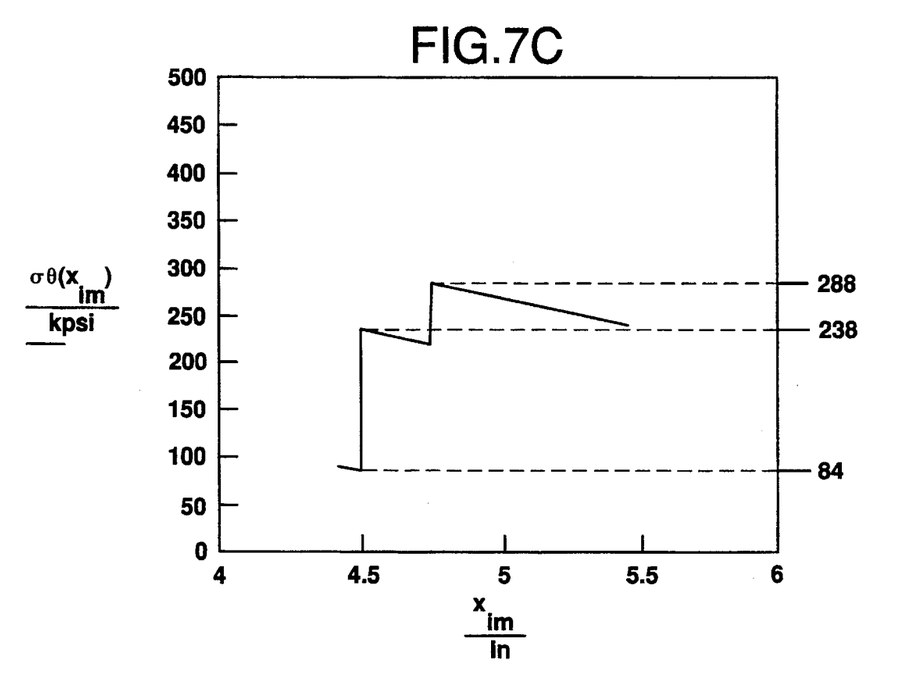

The junction of member 14 of the hub portion 100 with the cylindrical portion 11 is shown in FIG. 7A. The three materials disposed along the Line A—A, e.g., fiberglass, moderate strength graphite, and high strength graphite, advantageously create the desired combination of stiffness and density in this portion of the radius while keeping the radial stresses low. The radial and tangential stresses along this line are shown in FIGS. 7B and 7C, respectively. These stresses advantageously are well within the allowable limits for the respective materials.

Figure 9:
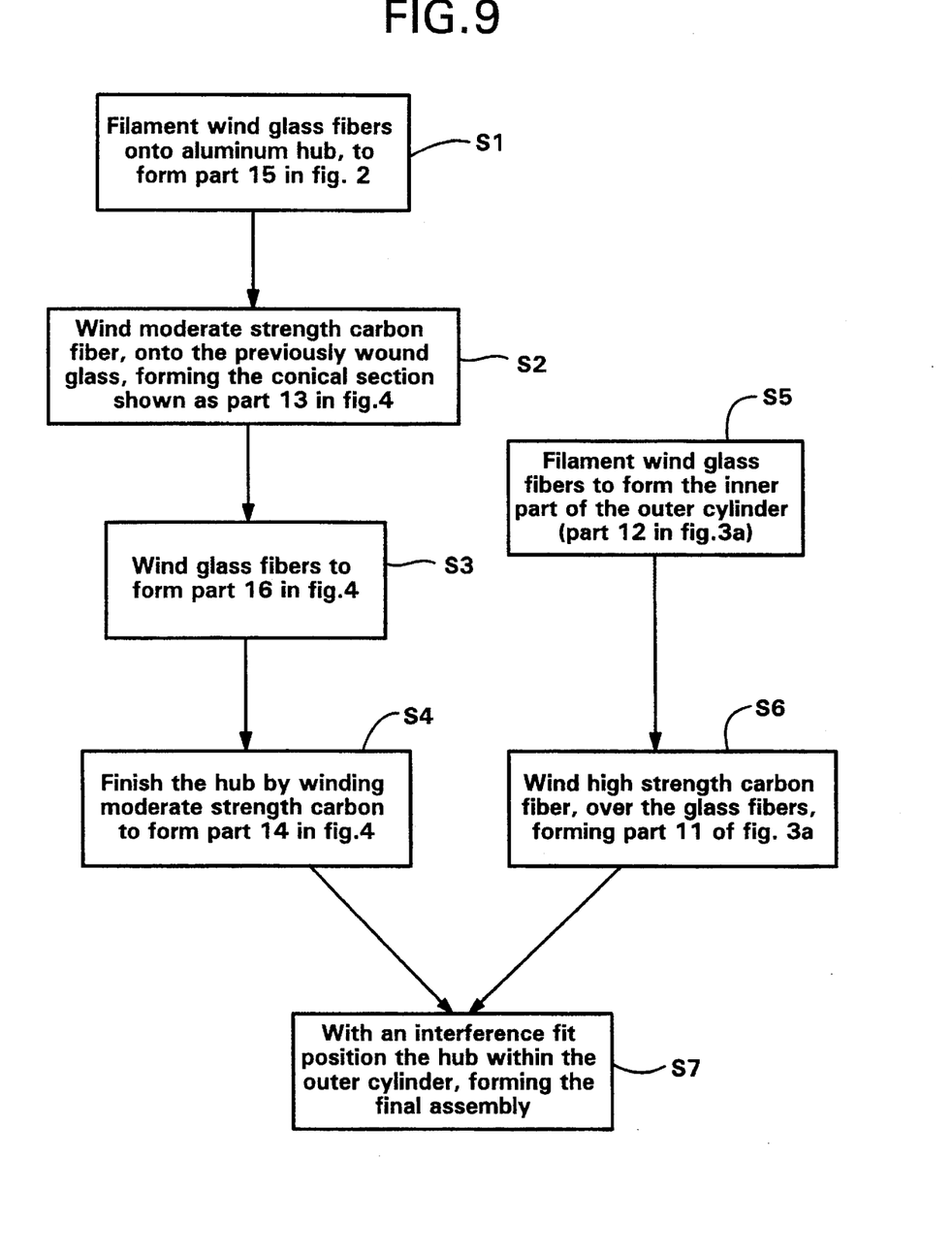
FIGS. 9 and 10 are high-level block diagrams illustrating alternative methods for fabricating the rotor according to the present invention.

The rotor 4 advantageously can be fabricated as two separate pieces, the hub portion 100 shown in FIG. 4 and the outer cylindrical portion 9 shown in FIG. 3A. The two parts advantageously are then mated with an interference fit. The sequence of events for this procedure is shown in FIG. 9 and discussed in greater detail below. In this two piece method, the fiberglass part, shown as member 16 in FIG. 4, provides mass loading, which ensures compression between the two portions during rotation.

Figure 10:
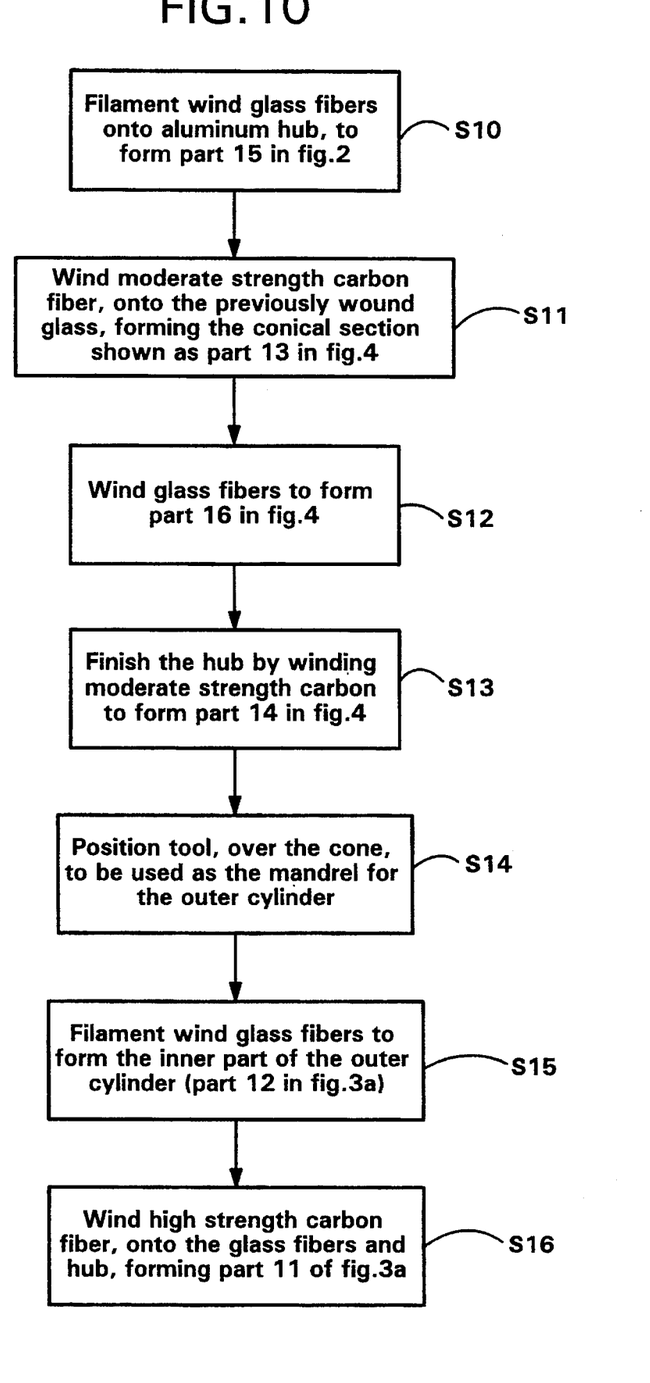

An alternative to the two piece method is to wind the cylinder right onto the hub, resulting in one integral part. The sequence of events for this method is shown in FIG. 10 and described in detail below.

As shown in FIG. 9, manufacturing of the hub portion includes a step S1 for winding filament glass fibers onto an aluminum cylinder to form hub member 15 of hub portion 100. During step S2, a moderate-strength carbon fiber is wound onto the cylindrical member 15, prepared according to step S1, to form the conical member 13 of hub portion 100. During step S3, a glass fiber is wound to form the cylindrical member 16 at the extreme end of conical member 13. During step S4, the hub portion is finished by winding moderate-strength carbon fibers around cylindrical member 16 to form section 14 of conical member 13.

Separately, filament wind glass fiber is wound on a spindle to form the inner cylinder member 12 of the outer cylinder portion 9, as shown in FIG. 3A. Subsequently, during step S6, a high-strength carbon fiber is wound over the glass fibers to form member 11 of cylinder portion 9, as shown in FIG. 3A.

When both the hub portion and the cylindrical portions have been prepared according to steps S1–S4 and steps S5–S6, respectively, the portions are interference fit to position the hub portion 100 within the inner cylindrical portion 9 to form the rotor 4 during step S7.

In an alternative method of manufacturing illustrated in FIG. 10, a filament glass fiber is wound onto aluminum hub member 15 as shown in FIG. 2 during step S10. Thereafter, during step S11, a moderate-strength carbon fiber is wound onto the previously wound glass fiber, forming a conical member of hub portion 100. During step S12, glass fibers are wound to form a right circular cylinder member 16, as shown in FIG. 4.

Subsequently, during step S13, the hub portion 100 is finished by winding a moderate-strength carbon fiber into the cylindrical member 16 to join up with the lower strength carbon fiber forming conical member 13. During step S14, a tool, i.e., a circular cylinder, is positioned over a conical member 13. The tool serves as a mandrel for supporting the outer cylinder portion 9 during winding. During step S15, filament wind glass fibers form the inner cylindrical member of cylinder portion. The rotor 4 is finished by winding high-strength carbon fiber onto the glass fiber forming member 12 of FIG. 3A.

Figure 8:
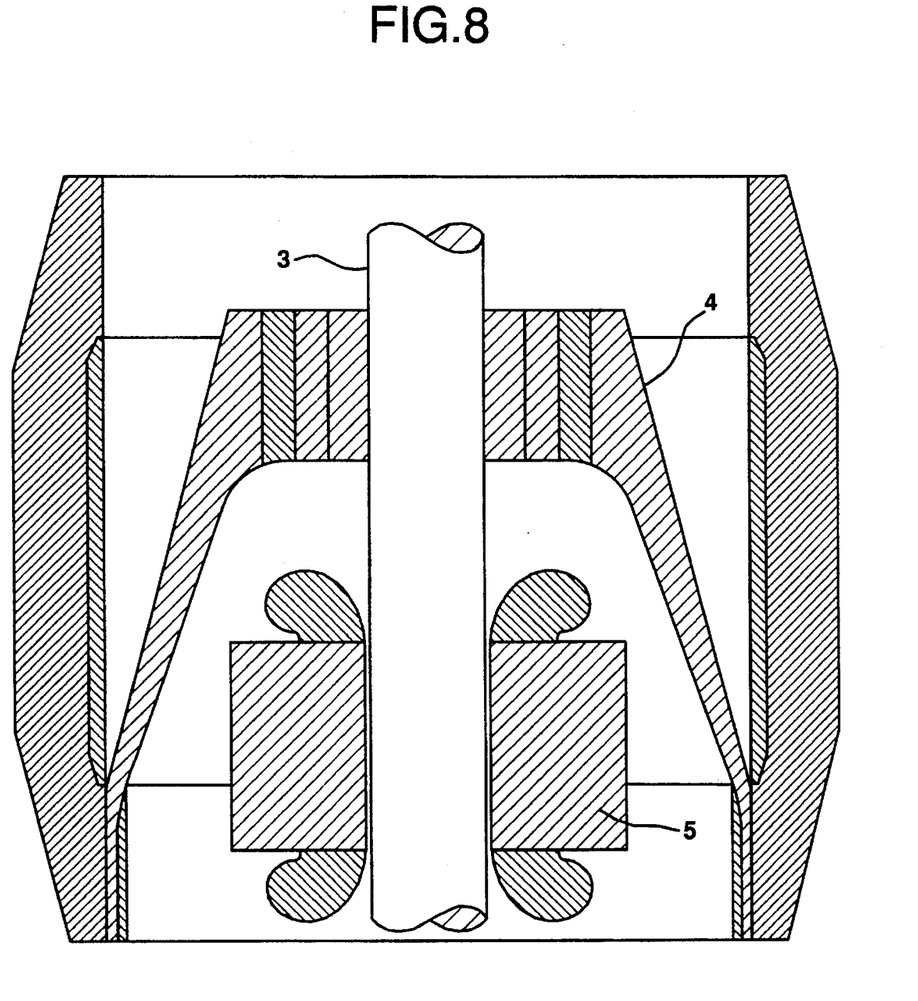
FIG. 8 is an illustrative view of the portion of the flywheel motor generator system depicting the location of the motor generator with respect to the hub portion.

The location of the high power motor-generator 5 with respect to the hub portion 100 of rotor 4 is shown in FIG. 8. It will be appreciated that this efficient use of space is important in minimizing the volume and weight of the flywheel energy storage system, which is particularly important in mobile applications.

The object of the invention is to provide a high energy storage capability in a light weight, low cost configuration which is capable of very high surge power. The foregoing description of the preferred embodiment is not intended to limit the invention to the precise form disclosed, as many variations are possible in light of the above teaching.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A flywheel rotor for a flywheel energy storage system, comprising:
   an outer, primarily cylindrical portion including first fibers having a predetermined first tensile strength for storing a relatively large amount of total system energy; and
   a hub portion including:
      a conical member formed from second fibers of a second predetermined second tensile strength; and
      an inner cylindrical member operatively connected to a rotatable shaft, said inner cylindrical member comprising:
   an aluminum cylinder having a plurality of slots extending inward from a circumference of said aluminum cylinder; and
   a fiberglass cylinder operatively disposed for connecting said aluminum cylinder to said conical member of said hub portion,
   wherein said conical member operatively connects a first end of said outer cylindrical portion with said inner cylindrical member, and
   wherein said first tensile strength is substantially greater than said second tensile strength.

2. The flywheel rotor as claimed in claim 1, wherein said outer cylindrical portion comprises:
   an outer cylindrical outer member having said first end and a second end and including said first fibers; and
   an outer cylindrical inner member comprising a material having a relatively high density and a relatively low modulus of elasticity with respect to said first fibers.

3. The flywheel rotor as claimed in claim 2, wherein said first and second ends of said outer cylindrical outer member are tapered.

4. The flywheel rotor as claimed in claim 3, wherein said first and second ends of said outer cylindrical outer member are tapered so as to permit reduction of radial stresses at an intersection between said hub portion and said outer cylindrical portion.

5. The flywheel rotor as claimed in claim 1, wherein the radius of said fiberglass cylinder is sized so as to permit said conical member to have a conical angle.

6. The flywheel rotor as claimed in claim 1, wherein said conical member has an associated conical angle less than a predetermined angle.

7. The flywheel rotor as claimed in claim 1, wherein said first fibers and said second fibers are carbon fibers.

8. A flywheel rotor for a flywheel energy storage system, comprising:
   an outer, primarily cylindrical portion including first fibers having a predetermined first tensile strength for storing a relatively large amount of total system energy, said outer cylindrical portion comprising:
      an outer cylindrical outer member having a first end and a second end and including said first fibers; and
      an outer cylindrical inner member comprising a material having a relatively high density and a relatively low modulus of elasticity with respect to said first fibers; and
   a hub portion including:
      a conical member formed from second fibers of a second predetermined second tensile strength; and
      an inner cylindrical member operatively connected to a rotatable shaft,
   wherein said conical member operatively connects said first end of said outer cylindrical outer member with said inner cylindrical member,
   wherein said first tensile strength is substantially greater than said second tensile strength, and
   wherein said first and second ends of said outer cylindrical outer member are tapered so as to permit reduction of radial stresses at an intersection between said hub portion and said outer cylindrical portion and wherein said outer cylindrical inner member permits reduction in radial stress in a center region of said outer cylindrical portion.

9. A flywheel energy storage system, comprising:
   a motor-generator; and
   a rotor, said rotor comprising:
      an outer, primarily cylindrical portion including first fibers having a predetermined first tensile strength for storing a relatively large amount of total system energy; and
      a hub portion including:
         a conical member formed from second fibers of a second predetermined second tensile strength; and
         an inner cylindrical member operatively connected to a rotatable shaft,
      wherein said conical member operatively connects a first end of said outer cylindrical portion with said inner cylindrical member,
      wherein said first tensile strength is substantially greater than said second tensile strength, and
      wherein said motor-generator is substantially disposed within a cavity defined by said conical member.

10. The flywheel energy storage system as claimed in claim 9, wherein said inner cylindrical member comprises:
    an aluminum cylinder having a plurality of slots extending inward from a circumference of said aluminum cylinder; and
    a fiberglass cylinder operatively disposed for connecting said aluminum cylinder to said conical member of said hub portion.

11. The flywheel energy storage system as claimed in claim 9, wherein said first fibers and said second fibers are carbon fibers.

12. The flywheel energy storage system as claimed in claim 9, wherein said conical member has an associated conical angle less than a predetermined angle.

13. The flywheel energy storage system as claimed in claim 9, wherein said hub portion is operatively connected to said first end of said outer cylindrical portion and wherein said first end of said outer cylindrical portion is conically tapered in an axial direction so as to permit a reduction in radial stress in a region where said hub portion is connected to said outer cylindrical portion.

14. A flywheel rotor for a flywheel energy storage system, comprising:

an outer, primarily cylindrical portion including first fibers having a predetermined first tensile strength for storing a relatively large amount of total system energy; and a hub portion fixedly coupled to said outer cylindrical portion including:
a single conical member formed from second fibers of a second predetermined second tensile strength; and
an inner cylindrical member operatively connected to a rotatable shaft, wherein said conical member directly connects a first end of said outer cylindrical portion with said inner cylindrical member, wherein a second end of said outer cylindrical portion is disposed proximate to said inner cylindrical member whereby the separation between said second end of said outer cylindrical portion and said inner cylindrical member is substantially less than the separation between said first end of said outer cylindrical portion and said inner cylindrical member, and wherein said first tensile strength is substantially greater than said second tensile strength.

15. The flywheel rotor as claimed in claim 14, wherein said inner cylindrical member comprises:

an aluminum cylinder having a plurality of slots extending inward from a circumference of said aluminum cylinder; and a fiberglass cylinder operatively disposed for connecting said aluminum cylinder to said conical member of said hub portion.

16. A flywheel energy storage system, comprising:

a motor-generator; and a rotor, said rotor comprising:
an outer, primarily cylindrical portion including first fibers having a predetermined first tensile strength for storing a relatively large amount of total system energy; and
a hub portion including:
a single conical member formed from second fibers of a second predetermined second tensile strength; and
an inner cylindrical member operatively connected to a rotatable shaft, wherein said single conical member directly connects a first end of said outer cylindrical portion with said inner cylindrical member, wherein a second end of said outer cylindrical portion is disposed proximate to said inner cylindrical member whereby, the separation between said second end of said outer cylindrical portion and said inner cylindrical member is substantially less than the separation between said first end of said outer cylindrical portion and said inner cylindrical member, and wherein said first tensile strength is substantially greater than said second tensile strength, and wherein said motor-generator is substantially disposed within a cavity defined by said conical member.

17. The flywheel energy storage system as claimed in claim 16, wherein said inner cylindrical member comprises:

an aluminum cylinder having a plurality of slots extending inward from a circumference of said aluminum cylinder; and a fiberglass cylinder operatively disposed for connecting said aluminum cylinder to said conical member of said hub portion.

* * * * *